March 28, 1961 W. HOFGESANG 2,976,714

LOCK FOR LATCHES

Filed Oct. 8, 1958

INVENTOR.
William Hofgesang

BY Marshall J. Breen

ATTORNEY 2,976,714

LOCK FOR LATCHES

William Hofgesang, Avenel, N.J., assignor to The Singer Manufacturing Company, Elizabeth, N.J., a corporation of New Jersey Filed Oct. 8, 1958, Ser. No. 765,984

2 Claims. (Cl. 70—63)

Figures 1, 2, 3, 4, 5, 6, 9:
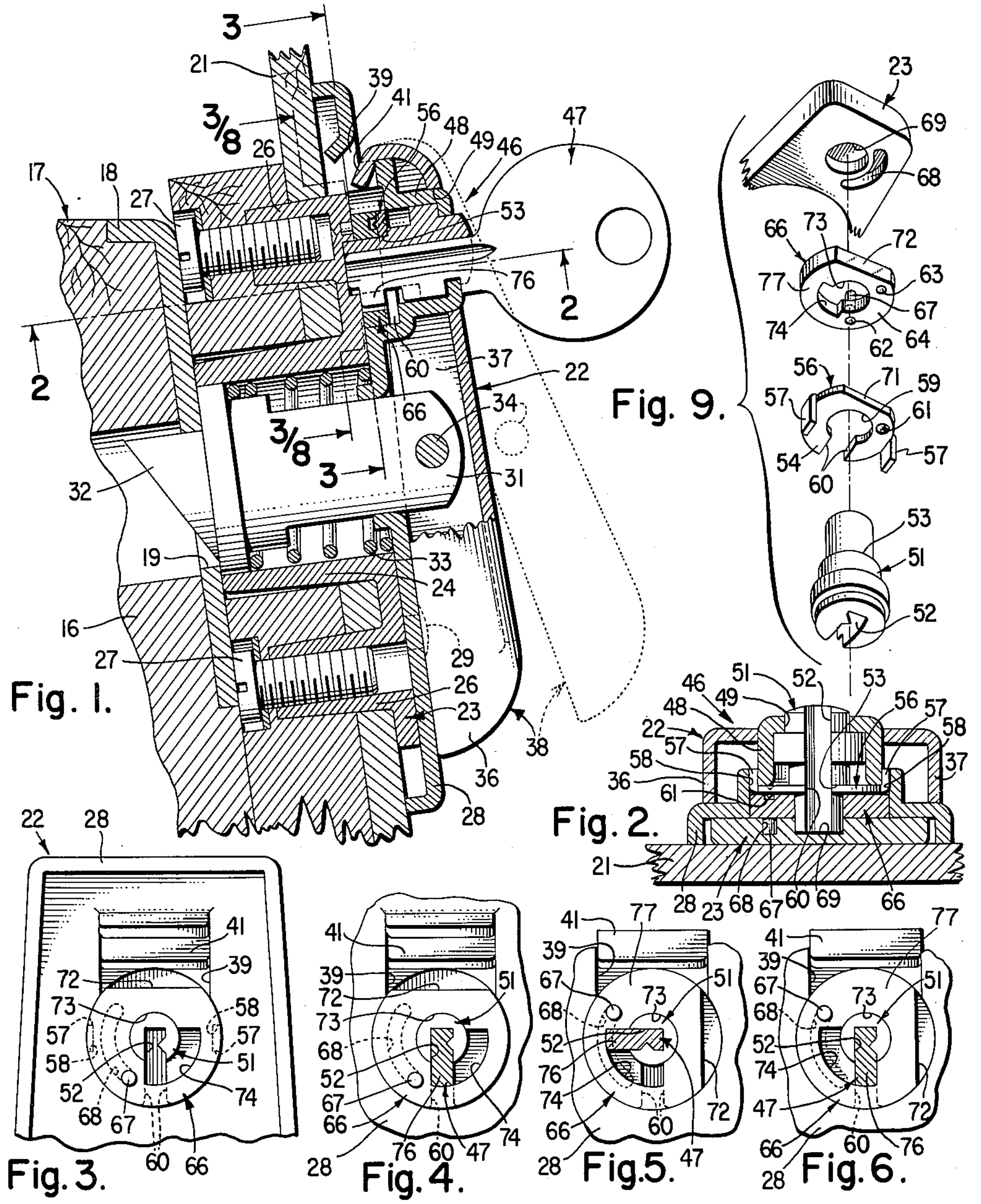

This invention relates to locks and more particularly to a lock especially adapted to be used with a latch having a pivotally mounted handle, and the present invention has for its primary object to provide an improved device of this character.

Another object of the invention is to provide an improved lock operated by a key, the key being capable of removal regardless of whether the latch is locked or unlocked.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 7:
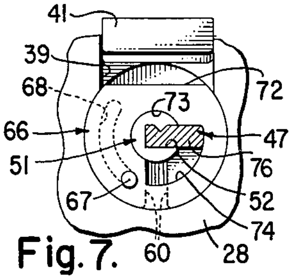
Figure 8:
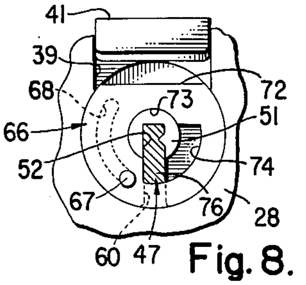

In the drawings:

Fig. 1 is a cross sectional view taken substantially through the center of a latch and lock embodying the present invention, Fig. 2 is a sectional view taken substantially on the line 2—2 of Fig. 1, Figs. 3 to 8, inclusive, are views taken substantially on the lines 3/8—3/8 of Fig. 1, and showing various positions as listed below:

Fig. 3, latch unlocked, key removed,
Fig. 4, latch unlocked, key in place,
Fig. 5, latch locked, key cannot be removed,
Fig. 6, latch locked, key ready for removal,
Fig. 7, latch unlocked, key cannot be removed,
Fig. 8, latch unlocked, key ready for removal, and Fig. 9 is an exploded perspective view of parts of the lock and latch illustrated in Figs. 1 to 8, inclusive.

Referring more specifically to the drawings, Fig. 1 illustrates the lock of the present invention as mounted on a latch adapted to secure the cover to the base of a sewing machine carrying case of the type more fully shown in United States patent application Serial No. 459,351, filed September 30, 1954, now United States Patent No. 2,856,726.

The base 16 of the sewing machine carrying case 17 is provided with a keeper 18 having an aperture 19. The cover 21 of the carrying case 17 is equipped with a latch 22 of the type fully shown in United States patent application Serial No. 731,549, filed April 28, 1958, now United States Patent No. 2,966,377. The latch 22 comprises a flanged base 23 having a sleeve 24 and a pair of threaded lugs 26 for receiving mounting screws 27. An escutcheon 28 is fastened to the base 23 by a plurality of rivets 29, of which only one is shown. The sleeve 24 and escutcheon 28 slidably support a bolt 31, the inner end of said bolt carrying a wedge-shaped nose 32. A helical compression spring 33 is positioned between the inner face of the escutcheon 28 and the nose 32, thereby biasing the bolt 31 inwardly. The external end of the bolt 31 has a hole which accommodates a pin 34. The pin 34 is carried by a pair of flanges 36—37 of a channel-shaped operating lever 38, and the upper end of the lever 38 is pivotally supported in a slot 39 formed in the escutcheon 28. In order to accomplish this, the upper end of the operating lever 38 has a hooked end 41 which widthwise is slightly enlarged and which extends into the slot 39, thereby providing a hinge for the operating lever 38. The lower end of the lever 38 is cut away to provide the lever 38 with means for receiving the finger of a person wishing to operate the latch 22.

The latch 22 is equipped with a lock 46 having a key 47. In order to accommodate the lock 46, the upper portion of the escutcheon 28 has been provided with a lock housing 48 which extends outwardly through a hole 49 formed in the upper end of the operating lever 38. A key hub 51, which has a radially disposed key slot 52, is turnably mounted in the housing 48. An inner shoulder 53 formed on the hub 51 abuts the front face 54 of a ward 56, this ward being prevented from turning by a pair of forwardly extending fingers 57—57 entering apertures 58—58 in the lock housing 48. The ward 56 also has a central circular hole 59 and a radial cut 60.

The rear face of the ward 56 has a small bump formed as the result of a depression 61 formed in the front face 54. The small bump is selectively engaged by either of two depressions 62 and 63 formed in the outer face 64 of a turnably mounted dog 66. The dog 66 is limited in its turning movement to approximately forty-five degrees (45°) by an axially disposed pin 67 protruding from the rear face of the dog 66, which pin 67 enters a forty-five degree (45°) arcuate slot 68 formed coaxially with respect to a circular depression 69, both the arcuate slot 68 and depression 69 being formed in the front face of the base 23. One edge of the ward 56 has an external segmental cut 71 and one edge of the rim of the dog 66 has a segmental cut 72. The cuts 71 and 72 provide a clearance space in which the extreme hooked end 41 of the operating lever 38 is free to enter in a manner presently described.

The above mentioned dog 66 has a centrally located circular hole 73 which is enlarged at one side by a forty-five degree (45°) lost motion aperture 74. A land 76 approximately formed on the key 47, when entered into the lost motion aperture 74, may be used to shift the dog 66 from a first position (Figs. 3, 4, 7 and 8), in which the segmental cut 72 of the dog 66 provides clearance for the hooked end 41 of the operating lever 38, to a second position (Figs. 5 and 6), in which an uncut rim portion 77 of the dog 66 interferes with and thereby prevents movement of the hooked end 41 of the operating lever 38. The uncut portion 77, when in the position shown in Figs. 5 and 6, prevents the lever 38 from being moved and thus prevents the bolt 31 from opening the latch 22.

Due to the land 76 of the key 47 and the body of the ward 56, the key 47 cannot be removed from the lock 46 except when the key 47 is in the vertical position shown in Figs. 1, 4, 6 and 8. In the vertical position, the land 76 passes through the cut 60. When the key 47 is in any other position, for example, the position shown in Figs. 5 and 7, the land 76 is located below the ward 56 which thereby holds the key 47 in the lock. Turning the key 47 in a clockwise direction one-quarter turn from the vertical position shown in Fig. 4, causes the land 76 to turn the dog 66 forty-five degrees (45°) from the position shown in Fig. 4 to the position shown in Fig. 5. This causes the uncut portion 77 of the dog 66 to interfere with movement of the hooked end 41 of the lever 38, thereby locking the latch 22. Turning the key 47 in a counterclockwise direction one-quarter turn from the vertical position shown in Fig. 6, causes the land 76 to turn the dog 66 forty-five degrees (45°) from the position shown in Fig. 6 to the position shown in Fig. 7. This places the segmental cut 72 of the dog 66 in such a position as to allow the hooked end 41 to move into the cut 72, thereby unlocking the latch 22 and allowing the lever 38 to move the bolt 31. Because of the lost motion aperture 74, the key 47 can be turned to the vertical position regardless of whether the latch is locked or unlocked and therefore the key can be removed from the lock regardless of whether the latch is locked or unlocked.

In operation, the latch 22 and the lock 46 combination functions as follows: Fig. 3 shows the latch 22 unlocked and the key 47 removed from the lock. Under these conditions, the end 41 is free to enter the segmental cut 72, thereby permitting the lever 38 to open the bolt 31. Fig. 4 is the same as Fig. 3 except that the key 47 is in the lock 46. In Fig. 5, the key 47 has been turned forty-five degrees (45°) clockwise. This has turned the dog 66 and caused the uncut portion 77 to prevent movement of the hooked end 41. Thus, the latch 22 is locked. In Fig. 6, the key 47 has been turned forty-five degrees (45°) counterclockwise, but the dog 66 still locks the latch 22. Under these conditions, the key 47 can be removed. In Fig. 7, the key 47 has been turned forty-five degrees (45°) counterclockwise. This has turned the dog 66 and caused the cut 72 to allow movement of the end 41. Thus, the latch is unlocked. In Fig. 8, the key 47 has been turned forty-five degrees (45°) clockwise, but the dog 66 has not moved. Under these conditions, the key 47 can be removed.

Having thus set forth the nature of my invention, what I claim herein is:

1. A lock and latch for the cover of a sewing machine carrying case comprising in combination an apertured escutcheon, said escutcheon being adapted to be secured to the cover of the carrying case; a sleeve secured to said escutcheon and adapted to pass through an aperture in said cover; a bolt housed in said sleeve; a spring biasing said bolt away from said escutcheon; an apertured operating lever; a curved hook, having an end formed on said lever, the curved portion of said hook passing through an aperture in said escutcheon to position the end of said hook below the inner surface of said escutcheon and thereby hingedly mounting said lever on said escutcheon, a lock mounted on said escutcheon adjacent to said aperture in said escutcheon; a connection between said bolt and said lever; a dog formed as part of said lock, said dog having a cutaway portion and an uncutaway portion, and means for turning said dog to either of two selected positions, one of said positions moving the uncutaway portion of said dog to a position adjacent to the free end of the said hook formed on said lever to lock said lever, and the other of said positions moving the cutaway portion of said dog to a position adjacent to the free end of the said hook formed on said lever to unlock said lever.

2. A lock and latch for the cover of a sewing machine carrying case comprising in combination an apertured escutcheon, said escutcheon being adapted to be secured to the cover of the carrying case; a sleeve secured to said escutcheon and adapted to pass through an aperture in said cover; a bolt housed in said sleeve; a spring also housed in said sleeve and biasing said bolt away from said escutcheon; an apertured operating lever; a curved hook having an end formed on said lever, the curved portion of said hook passing through an aperture in said ecsutcheon to position the end of said hook below the inner surface of said escutcheon and thereby hingedly mounting said lever on said escutcheon, a lock mounted on said escutcheon adjacent to said aperture in said escutcheon, said lock passing through an aperture in said lever at a location adjacent to said hinge; a connection between said bolt and said lever, said connection being positioned on the side of said lock remote from said hinge; a dog formed as part of said lock, said dog having a cutaway portion and an uncutaway portion; and means for turning said dog to either of two selected positions, one of said positions moving the uncutaway portion of said dog to a position adjacent to the free end of the said hook formed on said lever to lock said lever and the other of said positions moving the cutaway portion of said dog to a position adjacent to the free end of the said hook formed on said lever to unlock said lever.

References Cited in the file of this patent

UNITED STATES PATENTS

| | | |
|---|---|---|
| 686,345 | Schindler | Nov. 12, 1901 |
| 832,106 | Werner | Oct. 2, 1906 |
| 1,877,612 | Stieglitz | Sept. 13, 1932 |
| 2,156,513 | Roedding | May 2, 1939 |
| 2,313,711 | Jacobi | Mar. 9, 1943 |
| 2,783,636 | Scott | Mar. 5, 1957 |

FOREIGN PATENTS

| | | |
|---|---|---|
| 17,148 | Great Britain | Aug. 27, 1901 |
| 961,588 | France | Nov. 21, 1949 |